Jan. 5, 1960 H. E. D. SCOVIL ET AL 2,920,292
POWER SATURABLE WAVE GUIDE COMPONENTS
Filed Aug. 30, 1956 3 Sheets-Sheet 1

INVENTORS: H.E.D. SCOVIL
H. SEIDEL
BY Roy M. Porter, Jr.
ATTORNEY

POWER SATURABLE WAVE GUIDE COMPONENTS

Filed Aug. 30, 1956 3 Sheets-Sheet 2

INVENTORS: H.E.D. SCOVIL
H. SEIDEL
BY Roy M. Porter, Jr.
ATTORNEY

Jan. 5, 1960 H. E. D. SCOVIL ET AL 2,920,292

POWER SATURABLE WAVE GUIDE COMPONENTS

Filed Aug. 30, 1956 3 Sheets-Sheet 3

INVENTORS: H. E. D. SCOVIL
H. SEIDEL
BY Roy M. Porter Jr.
ATTORNEY

United States Patent Office 2,920,292
Patented Jan. 5, 1960

2,920,292

POWER SATURABLE WAVE GUIDE COMPONENTS

Henry E. D. Scovil, Morristown, and Harold Seidel, Plainfield, N.J., assignors to Bell Telephone Laboratories, Incorporated, New York, N.Y., a corporation of New York Application August 30, 1956, Serial No. 607,066

2 Claims. (Cl. 333—24)

This invention relates to electromagnetic wave transmission systems and, more particularly, to gyromagnetic elements having a nonlinear attenuation characteristic for use in such system.

It is an object of the present invention to introduce nonlinear attenuation characteristics into microwave transmission systems by means of passive circuit elements.

It is a more specific object of the invention to automatically control the level of power flow in a microwave transmission system by means of a power limiter of gyromagnetic material.

It is another object of the invention to provide separate paths of power flow for electromagnetic wave energy having different power levels by means of a gyromagnetic switching element.

It has been observed that materials of the type having the properties described by the mathematical analysis of D. Polder, Philosophical Magazine, volume 40, pages 99 through 115 (1949), have certain anomalous attenuation characteristics which were not predicted by Polder's theory. This class of materials, a chief one among them being ferrite, is characterized by certain unpaired electron spins which respond to a transmitted microwave signal by precessing gyroscopically about the line of an applied magnetic field. The interaction of these precessing electron spins with the applied microwave signal results in certain magnetic properties which have given these materials the name "gyromagnetic". Polder's so-called "small signal" theory predicts an attenuation characteristic as shown by the solid curve 10 in Fig. 1 of the drawings. Also shown in Fig. 1 is dashed curve 11 representing what may be called the large signal response of gyromagnetic materials. It will be observed that the large signal response exhibits certain anomalous characteristics in the regions of two particular applied field values which are not predicted by Polder's theory and are not present at smaller signal levels. Thus, at the field value $H_s$, the attenuation for large signals is much greater than for small signals, while at another field value $H_m$, the attenuation for large signals is much less than that for small signals. This large signal behavoir of gyromagnetic materials has been observed by R. W. Damon, Reviews of Modern Physics, volume 25, pages 239 through 245, January 1953, and by N. Bloembergen and S. Wang, Physical Review, volume 93, pages 72 through 83, January 1954.

In accordance with the present invention, a variety of useful and novel microwave components are provided whose operation is based on the above-described anomalies in the attenuation characteristics of gyromagnetic materials. It has been found that the so-called "large signal" effects can in fact be made to occur at suprisingly low power levels and, furthermore, the shift from the small signal characteristic to the large signal characteristic is extremely abrupt, in the nature of a discontinuity in the attenuation characteristic. These properties have been utilized to provide several components of great simplicity and extreme usefulness.

In accordance with one aspect of the present invention, an element of gyromagnetic material is inserted in a conductively bounded wave guide and biased by a magnetic field of value $H_s$ as shown in Fig. 1. Under this condition, an incident electromagnetic signal will be freely transmitted past the gyromagnetic element when the power level of the signal has a value still within the scope of the small signal theory. However, when the power level of the incident signal reaches a certain critical level, the attenuation immediately jumps to the large signal attenuation characteristic and the signal is severely attenuated. It can be seen that such a device tends to act as a power limiter, limiting the output to a value near or at the critical level. The same effect can be obtained by biasing the gyromagnetic element by a field of value $H_m$, provided the element is in a bridge circuit and its output is used to balance out the input when the input rises above the critical level.

In accordance with another aspect of the invention, the large signal characterisic of gyromagnetic media is used to detune a wave guide cavity, thereby forming a transmit-receive (T-R) switch for duplexing circuits. The wave guide cavity is adjusted for complete transfer of energy for either the large signal or the small signal characteristic of a gyromagnetic element associated therewith. When the input signal shifts to the other power level, the cavity is detuned and the wave energy is reflected along an alternative transmission path. For example, an element of gyromagnetic material biased to $H_s$ is included within a cavity tuned to resonance under the small signal condition. This cavity is included in the wave guide path to the receiver in a duplexing circuit. The received signal, corresponding to a small signal power level, is freely transmitted through the cavity to the receiver. Under conditions of transmit, however, the high power level shifts the gyromagnetic element to the high attenuation characteristic, and the cavity is detuned. The power from the transmitter is therefore substantially all reflected from the cavity and passes to the antenna. Other forms of T-R cells and duplexing circuits can be provided by utilizing the properties of gyromagnetic media in connection with differnet circuit components such as coupled lines and hybrid junctions.

One primary advantage of the present invention resides in the fact that the gyromagnetic elements provided by the invention are extremely rugged and can be expected to out-live other equivalent components made with presently-known switching elements.

Another major advantage resides in the extreme structural and operational simplicity of the microwave components made available by the invention.

These and other objects and features, the nature of the present invention and its various advantages, will appear more fully upon consideration of the specific illustrative embodiments of the invention shown in the accompanying drawings and described in the following detailed explanation of the drawings.

In the drawings:

Fig. 1, given for the purposes of illustration, is a graphical and qualitative representation of the attenuation versus applied magnetic field characteristic of gyromagnetic media, showing the small signal and large signal response;

Figs. 2 and 3, given for the purposes of illustration, are graphical and qualitative representations of the attenuation versus applied power characteristics of gyromagnetic media at the field values $H_s$ and $H_m$, respectively, shown in Fig. 1;

Fig. 4 is a perspective view of one principal embodiment of the invention showing a gyromagnetic power limiter operating on the characteristic shown in Fig. 2;

Fig. 5, given for the purposes of illustration, is a graphical and qualitative representation of the power output versus power input characteristic of the power limiter shown in Fig. 4;

Figure 1:
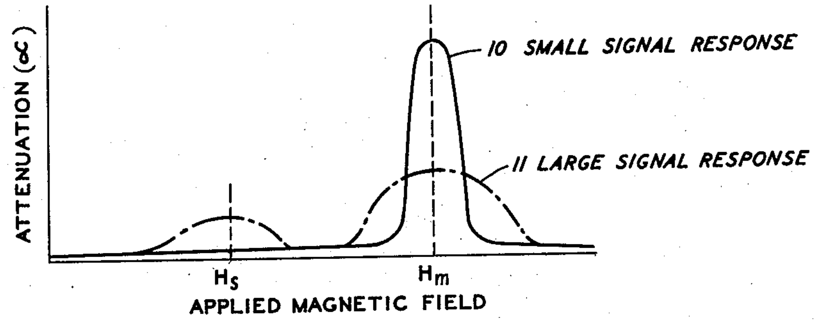

Referring more particularly to Fig. 1, there is shown, for the purposes of illustration, a graphical and qualitative representation of the attenuation ($\alpha$) versus applied magnetic field characteristics of gyromagnetic media. Solid curve 10 shows this characteristic for small signal levels below a critical value, to be discussed more fully below, and dashed curve 11 shows this characteristic for large signal levels above the critical value. The behavior of a gyromagnetic medium for small signals has been explained on the theory that in the presence of an applied magnetic field the unpaired electron spins in the medium line up parallel to one another and tend to behave gyroscopically as a single unit. Therefore, when the frequency of the applied signal is equal to the natural precession frequency of the electron spins, a resonant condition exists under which the electron spins are able to absorb large amounts of energy from the signal. This condition, which has been called the main gyromagnetic resonance, is shown at the applied field value $H_m$ in Fig. 1. At all other field values the attenuation is very low and may be neglected.

The simple uniform precession theory used above, however, does not explain the shape of the attenuation characteristic at large signal levels, represented by dashed curve 11 in Fig. 1. At these signal levels, the attenuation at main resonance becomes substantially lower and the resonance curve becomes substantially broader than at small signal levels. Furthermore, a second resonance, which may be termed the subsidiary resonance, appears at an applied field value of $H_s$, substantially less than $H_m$. An attempt will be made below to explain this anomalous behavior of polarized gyromagnetic media at high signal levels.

The small signal theory states that a microwave signal passing through a polarized gyromagnetic medium is coupled to the electron spins within the medium by means of the high frequency magnetic field components of the applied signal. The electron spins are driven en masse to precess gyroscopically at some angle about the line of the applied magnetic field. Not taken into account by this small signal theory is the coupling between this uniform precession of the electron spins and certain small perturbances in the electron spin system which may be called spin waves.

A gyromagnetic medium is continually in a state of thermal agitation, resulting in a minute and somewhat random misalignment of the electron spins. These perturbances can, by means of a Fourier analysis, be resolved into a series of waves, called "spin waves," which are all coupled to each other and to the uniform precession by means of interspin magnetic forces and electrostatic forces called exchange fields. A relatively narrow band of these spin waves, which may be called the preferred band, is much more strongly coupled to the uniform precession than the remainder of the spin waves due to a correspondence between their resonances in frequency and direction. The spin wave system, and especially the preferred band, can, by means of this coupling, absorb energy from the uniform precession. However, under conditions within the scope of the small signal theory, the energy loss to the spin wave system is sufficiently small to be negligible.

The condition of subsidiary resonance, represented by $H_s$ on Fig. 1, will now be investigated. Under this condition, very small amounts of energy can be coupled to the uniform precession due to the lack of correspondence between the applied frequency and the natural resonant frequency of the uniform precession. However, a small increase in the applied signal will raise the excitation of the uniform precession slightly, allowing small amounts of energy to be transferred to the preferred spin wave band and thence to the remainder of the spin wave system. Eventually this energy is transmitted to the crystal lattice to be dissipated as heat. Since the excitation level of the spin wave system has not changed, the attenuation offered to the microwave signal has not increased appreciably. So far the conditions have remained within the scope of the small signal theory.

As the power level of the applied signal continues to increase, however, a critical point is reached where the preferred band of spin waves can no longer transfer energy to the remainder of the spin wave system as fast as it is being received from the uniform precession. At this point, called the critical power level, the preferred band goes to a higher state of excitation to accommodate the increase in energy level. This band, being resonant with the uniform precession, is now more strongly coupled to the uniform precession and therefore receives even more energy from the uniform precession. This further increases the excitation level of the preferred band, allowing even further amounts of energy to be coupled thereto. This build-up cycle continues until the power absorbed by the preferred band is just sufficient to balance the losses of the resonant system. It can be seen that an unstable condition exists at the critical power which required large amounts of energy to be absorbed from the applied signal to regain stability. This results in a large increase in the attenuation offered to the applied signal. Any further increase in the power level of the applied signal is substantially all diverted into the preferred spin wave band. This condition is shown as the subsidiary resonance hump in dashed curve 11 of Fig. 1 at applied field value $H_s$. The change in attenuation can more readily be seen in Fig. 2.

Figure 2:
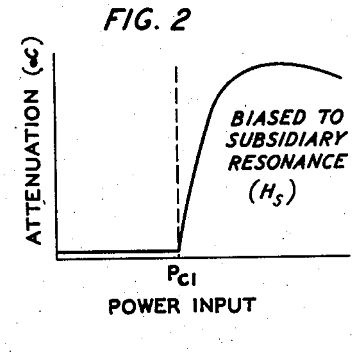

In Fig. 2 is shown, for the purposes of illustration, a graphical and qualitative representation of the attenuation versus power input characteristic of a gyromagnetic medium biased to a field value $H_s$ as shown in Fig. 1. It can be seen that the attenuation is very low for power inputs below the critical power $P_{c1}$. At this point, however, the attenuation suddenly jumps to a very high value due to the resonance between the uniform precession and the preferred spin wave band. Beyond this point the attenuation decreases slightly but retains substantially its high value. The power level at which the run-away condition occurs is a function of the magnetic state of the gyromagnetic medium, the precessional angle allowing easiest transfer of energy to the preferred spin wave band, and the relaxation time of the preferred spin waves. Furthermore, the value of the applied magnetic field for which subsidiary resonance occurs is usually somewhat less than main gyromagnetic resonance although it may coincide therewith under suitable conditions.

In the case of the main resonance at an applied magnetic field of $H_m$, the uniform precession is again coupled to a preferred band of spin waves having a frequency and direction of resonance closely resembling that of the uniform precession. Under this condition, however, the uniform precession is already absorbing large amounts of energy from the applied signal and is therefore near its maximum state of excitation. When the critical power level is reached and the preferred spin wave band can no longer get rid of energy as fast as it receives it, the preferred spin waves go to a higher state of excitation at the expense of the uniform precession. The removal of energy from the uniform precession decreases the coupling of this precession to the applied signal and hence the attenuation offered to the signal also decreases. Further increases in the power level of the applied signal result in further excitation of the preferred spin waves and a larger decoupling of the uniform precession from the applied signal. The attenuation therefore decreases and eventually goes to zero when the uniform precession is completely decoupled from the applied signal. This condition is shown as the decline and broadening of the main resonance peak in dashed curve 11 of Fig. 1 at applied field value $H_m$. The change in attenuation can more readily be seen by considering Fig. 3.

Figure 3:
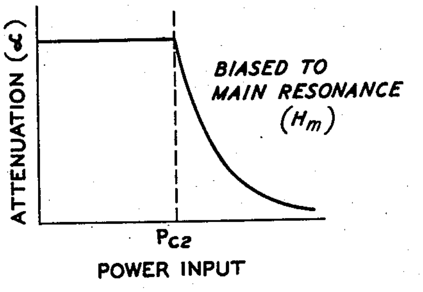

In Fig. 3 is shown, for the purposes of illustration, a graphical and qualitative representation of the attenuation versis power input characteristic of a gyromagnetic medium biased by a field value $H_m$ as shown in Fig. 1. It can be seen that the attenuation is very high for power inputs below the critical power $P_{c2}$. At this point, however, the attenuation suddenly drops to a low value due to the decoupling of the applied signal and the uniform precession. Thereafter the attenuation continues to decrease, approaching zero. The critical power level at which the decline in attenuation begins has been found to be governed by the same factors as govern the critical power level at subsidiary resonance. The characteristics shown in Figs. 2 and 3 have been utilized to provide a variety of nonlinear gyromagnetic components for microwave circuits.

Figures 4, 5:
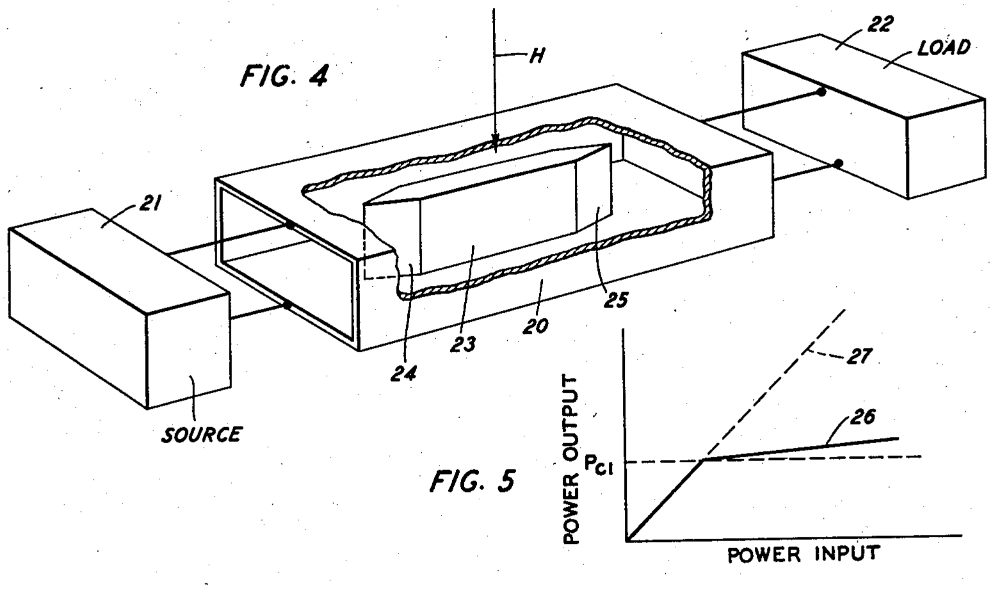

In Fig. 4 is shown a perspective view of a gyromagnetic power limiter representing a first principal embodiment of the invention. The power limiter shown in Fig. 4 comprises a section of rectangular wave guide 20 having a wider dimension substantially equal to twice the narrower dimension and preferably capable of supporting only the dominant mode of wave energy therein. Connected to one end of guide 20 is a source 21 of microwave energy having a varying power level. Source 21 may, for example, be a microwave amplifier having a variable output. Connected to the other end of guide 20 is a load 22 to which it is desired to introduce microwave signals at but not exceeding one given power level. Load 22 may, for example, be the discriminator stage of a frequency modulation receiver. In order to maintain the power level at load 22 at or below the critical value, a gyromagnetic power limiter is included within guide 20 between source 21 and load 22. Centrally located within guide 20 is a slab-shaped element 23 of gyromagnetic material such as, for example, ferrite, having the properties described with respect to Figs. 1, 2 and 3.

Element 23 extends between the broader walls of guide 20 parallel to and equally spaced from the narrower walls thereof. Element 23 may, however, have any other shape or be placed in any other position within guide 20 so long as it is substantially in the path of wave energy in guide 20. The ends of element 23 are provided with knife-edge tapers 24 and 25 to prevent undue reflection of wave energy therefrom.

Element 23 is magnetically biased or polarized by a magnetic field represented by the vector H in Fig. 4. This field may be supplied by any one of several methods including an electrical solenoid, an electrically energized magnet, or by permanently magnetizing element 23 itself. The value of the magnetic field H is adjusted so as to be equal to $H_s$ as shown in Fig. 1. Under this biasing condition, the structure of Fig. 4 acts as a power limiter in that any power above the critical power $P_{c1}$ is substantially all dissipated in gyromagnetic element 23, and the output to load 22 is of a substantially constant power level. The operation of the power limiter shown in Fig. 4 can be better understood by considering Fig. 5.

In Fig. 5 is shown, for the purposes of illustration, a graphical and qualitative representation of the power output versus power input characteristic of the power limiter shown in Fig. 4. Solid curve 26 in Fig. 5 represents the output to load 22 as the power input is increased. It will be seen that the power output increases only very slightly over the critical power $P_{c1}$ for large increases in the power input. Dashed curve 27 represents the power output in the absence of a power limiter and can be seen to be substantially equal to the power input. A power limiter such as that shown in Fig. 4 has a low power loss of less than one-half of a decibel. Furthermore, for an increase in power input of 17.5 decibels over the critical value, the output shows an increase of less than one-half decibel. If the figure of merit of a power limiter may be defined as the ratio of a change in power input to a corresponding change in power output, the figure of merit of the limiter shown in Fig. 4 is over 500 to 1.

Figure 6:
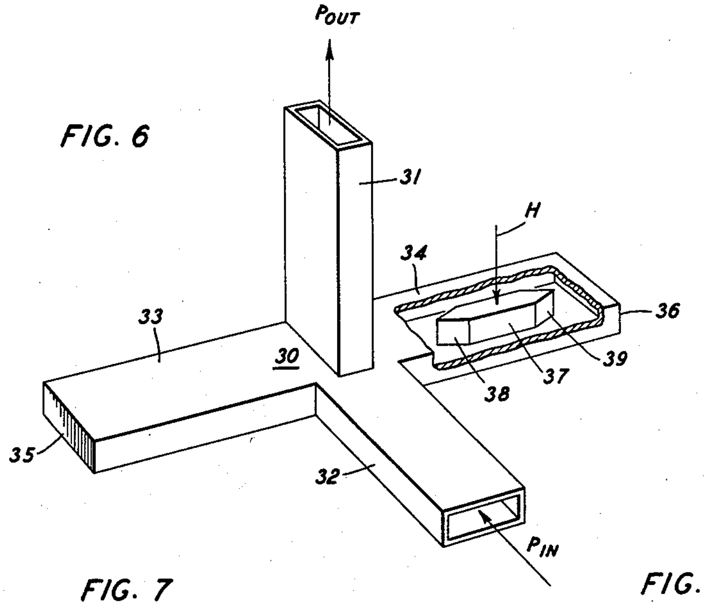
Fig. 6 is a perspective view of a gyromagnetic power limiter operating on the characteristic shown in Fig. 3.

In Fig. 6 is shown a perspective view of an alternative form of power limiter comprising a hybrid-T wave guide junction 30 having two symmetrical arms 33 and 34 of equal length and two asymmetrical arms 31 and 32. Symmetrical arm 34 contains a rectangular slab 37 of gyromagnetic material having tapered ends 38 and 39 to improve its impedance match to arm 34. Symmetrical arm 33 is terminated by a conductive plate 35 while symmetrical arm 34 is terminated by a conductive plate 36. Slab 37 is magnetically polarized in the direction of the vector labeled H by any of the methods discussed with respect to Fig. 4. Microwave power is introduced into hybrid 30 through asymmetrical arm 32 and withdrawn by means of asymmetrical arm 31.

In operation, the value of H is adjusted to equal $H_m$ as shown in Fig. 1. Under this condition of biasing, slab 37 is very lossy to microwave signals below a critical value of power and substantially transparent to signals above the critical value. When the power input to hybrid 30 is below twice the critical value $P_{c2}$, the power divides equally between the symmetrical arms 33 and 34. Power in arm 33 is reflected from plate 35 back toward junction 30. Power in arm 34, however, is substantially all absorbed by slab 37. A portion of the reflected half from arm 33 is coupled to asymmetrical arm 31 and thence out to a load. When the power input to arm 32 is above twice the critical value $P_{c2}$, it again divides equally between arms 33 and 34 and is again reflected in arm 33 from plate 35 back toward junction 30. The power in arm 34, however, now drives slab 37 into a low attenuation state. A major portion of the power, therefore passes to plate 36 where it is reflected back toward junction 30. Since these reflections are in phase when they return to junction 30, they tend to cancel each other out in arm 31. However, due to the small amount of attenuation experienced by the energy in arm 34 as a result of its double passage over slab 37, the reflected energy from arm 34 at junction 30 is slightly less than the reflected energy from arm 33. Hence the difference between the two reflected energies produces a net resultant at the junction which has some small though finite value, a portion of which passes to arm 31 and thence to the load.

It can be seen that the structure of Fig. 6 acts as a power limiter limiting the output to a value nearly equal to the critical power $P_{c2}$. While the power limiter of Fig. 6 is embodied in a hybrid wave guide junction, any bridge network having two symmetrical arms with a gyromagnetic element in one will serve equally well. The hybrid junction represents one of the simplest methods of providing this bridge circuit. Clearly, since the operation of the power limiter shown in Fig. 6 depends upon the cancellation of reflections at high power levels rather than actual absorption in the gyromagnetic element as in Fig. 4, this limiter is inherently capable of handling larger amounts of power than the limiter shown in Fig. 4.

Figure 7:
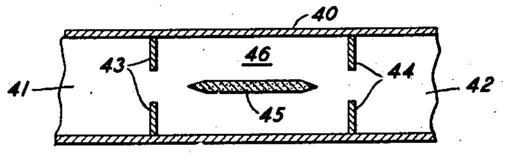
Fig. 7 is a cross-sectional view of a power-operated gyromagnetic switch or T-R cell in accordance with the principles of the invention.

In Fig. 7 is shown a cross-sectional view of a power-operated gyromagnetic switch capable of both T-R and anti-T-R operation and comprising a section of conductively bounded wave guide 40 having two ends 41 and 42. Included within guide 40 between ends 41 and 42 is a resonant cavity 46 formed between two sets of conductive irises 43 and 44. Included between irises 43 and 44 in cavity 46 is an element 45 of gyromagnetic material similar in all respects to element 23 in Fig. 1.

In operation, element 45 is biased by a magnetic field to a value equal to either $H_s$ or $H_m$ as shown in Fig. 1. In the former case, cavity 46 between irises 43 and 44 is tuned to freely pass incident wave energy below the critical power $C_{c1}$. In the latter case, when element 45 is biased to $H_m$ cavity 46 is tuned to fully pass wave energy above the critical power $P_{c2}$. In both cases it can be seen that cavity 46 is tuned under the condition of low attenuation offered by element 45. When cavity 46 is tuned at low powers, corresponding to a biasing to subsidiary resonance, the increase of the input to provide at element 45 a power level above the critical value will effectively isolate irises 43 and 44, and detuning the cavity radically and reflecting substantially all of the incident power from iris 43. Similarly, when cavity 46 is tuned to high power levels, corresponding to a biasing to the main resonance, a decrease in the power level of the input to provide at element 45 a value below the critical value will again detune the cavity radically, allowing substantially all of the incident power to be reflected. It can be seen that the configuration of Fig. 7 acts as a T-R or A-T-R switch operated by the power level of the input. When biased to subsidiary resonance, it passes all signals below the critical level and reflects all signals above the critical level, thus giving T-R operation. When biased to the main resonance, it passes all signals above the critical level and reflects all signals below the critical level, thus giving anti-T-R operation. This switch will hereinafter be referred to as a "through transmission" power-operated switch of the T-R or A-T-R type, respectively.

Figure 8:
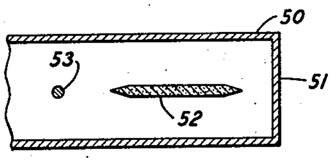
Fig. 8 is a cross-sectional view of another form of power-operated switch or T-R cell in accordance with the principles of the invention.

In Fig. 8 is shown a cross-sectional view of another power-operated gyromagnetic switch comprising a section of conductively bounded wave guide 50 terminated at one end by a conductive plate 51. Located within guide 50 is a rectangular slab 52 of gyromagnetic material. Slab 52 is in all respects identical to element 23 in Fig. 4 and is magnetically biased either to subsidiary resonance or to main resonance. A conductive impedance matching post 53 is provided to match the impedance of slab 52 to the guide under conditions of high attenuation. When biased to subsidiary resonance, the switch shown in Fig. 8 reflects substantially all signals below the critical power level $P_{c1}$ and absorbs all signals above this critical power level. When biased to main resonance, this switch reflects substantially all signals above the critical power level $P_{c2}$ and absorbs all signals below this critical power level. It is therefore hereinafter termed a gyromagnetic switch of the power absorption type. The use of switches such as those shown in Figs. 7 and 8 for transmit-receive cells is further illustrated in Figs. 9 and 10.

Figure 9:
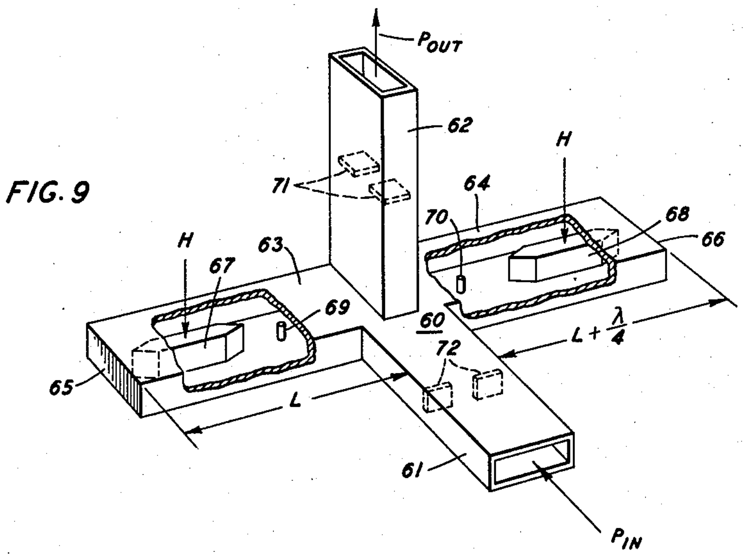
Fig. 9 is a perspective view of a T-R cell employing two power-operated switches as shown in Fig. 8 in the symmetrical arms of a hybrid junction.

In Fig. 9 is shown a transmit-receive cell employing two power absorption switches such as shown in Fig. 8. The T-R cell of Fig. 9 performs all of the functions of the switch shown in Fig. 7 and, furthermore, substantially eliminates any power leakage such as is possible past resonant cavity 46 in Fig. 7. The T-R cell of Fig. 9 comprises a wave guide hybrid-T junction 60 having two symmetrical arms 63 and 64 and two asymmetrical arms 61 and 62. Symmetrical arms 63 and 64 are terminated one-quarter wavelength of the operating frequency apart by conductive plates 65 and 66. Power is introduced into junction 60 through arm 61 and removed by arm 62. Included within arms 63 and 64 are power absorption switches as shown in Fig. 8 comprising gyromagnetic elements 67 and 68 and associated matching posts 69 and 70. Each of elements 67 and 68 is magnetically biased as represented by vectors H.

Included within asymmetrical arm 61 is a pair of irises 72 and included within asymmetrical arm 62 is another pair of irises 71. Irises 71 and 72 are arranged to form a resonant cavity therebetween when elements 67 and 68 are in a nondissipating state. It can be seen that under this condition power is freely transmitted from arm 61 to arm 62. If elements 67 and 68 are biased to the subsidiary resonance hump, the switch will be open for signals of low power level below $P_{c1}$; if these elements are biased to the main resonance hump, the switch will be open for signals of high power level, above $P_{c2}$. When the power level of the input signal drives elements 67 and 68 lossy, the signal again divides in arms 63 and 64, but, instead of being reflected from plates 65 and 66, the signal is completely absorbed in elements 67 and 68. This radically detunes the cavity formed between irises 71 and 72 and substantially all of the signal introduced into arm 61 is therefore reflected from irises 72. The small amount of power which leaks past irises 72 is either dissipated in elements 67 and 68 or reflected by irises 71 in arm 62. It can be seen that the structure of Fig. 9 operates as a T-R cell when elements 67 and 68 are biased to subsidiary resonance, passing low power signals and reflecting high power signals. When these elements are biased to main resonance, the structure acts as an anti-T-R cell, passing high power signals and reflecting low power signals.

Figure 10:
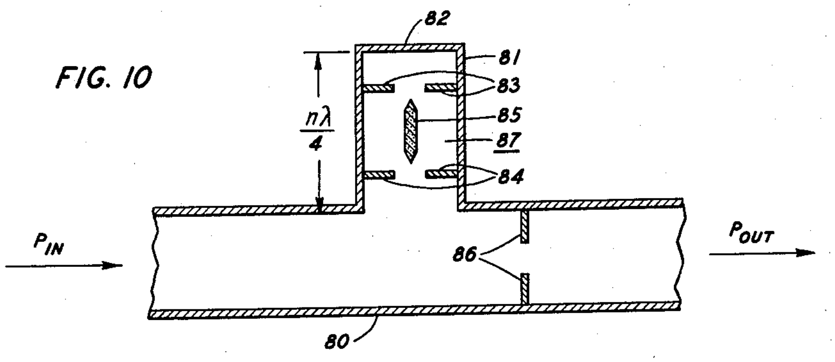
Fig. 10 is a cross-sectional view of an anti-T-R cell employing a power-operated switch as shown in Fig. 7 in a branch wave guide.

In Fig. 10 is shown a cross-sectional view of another form of switch or cell suitable for use in duplexing circuits and utilizing the switch shown in Fig. 7. The switch shown in Fig. 10 comprises a section of conductively bounded wave guide 80 to which a signal is introduced at one end and withdrawn from the other end. Connected to guide 80 is a shunt branch guide 81 terminated by a conductive plate 82 an odd number of quarter-wavelengths of the operating frequency from guide 80. Included within branch arm 81 is a resonant cavity 87 formed by two pairs of conductive irises 83 and 84. Within cavity 87 is an element 85 of gyromagnetic material in all respects identical to element 23 in Fig. 4. Cavity 87 is tuned to freely pass wave energy when element 85 is in a low-loss state. This corresponds to a low power signal below $P_{c1}$ when element 85 is biased to subsidiary resonance, and to a high power signal above $P_{c2}$ when element 85 is biased to main resonance. Under this condition, wave energy freely passes through cavity 87, is reflected from plate 82 and travels back to guide 80. Since branch guide 81 is an odd number of quarter-wavelengths long, the returning wave energy is 180 degrees out of phase with the energy in guide 80. This presents in effect an open circuit in guide 80 at branch guide 81, allowing substantially all of the incident wave energy to pass the junction. A conductive iris 86 is provided in guide 80 beyond the junction with branch guide 81. Iris 86 reflects substantially all of the energy passing arm 81, thereby reducing the output of guide 80 to a low value.

When the power level of the signal introduced into guide 80 shifts sufficiently to make element 85 highly dissipative, cavity 87 is radically detuned and wave energy is substantially all reflected from iris 84 rather than passing through to plate 82. This reflected wave energy is no longer 180 degrees out of phase with the energy in guide 80, but may be adjusted, by proper location of cavity 87, such as to form a resonant cavity with iris 86. It can been seen that under this condition wave energy is freely transmitted through guide 80 and appears in the output substantially undiminished. The structure of Fig. 10 therefore acts as a power-operated switch, reflecting a signal of one power level and transmitting a signal of another power level. When element 85 is biased to subsidiary resonance, this structure operates as an A-T-R cell, reflecting signals below the critical power level $P_{c1}$ and transmitting signals above this critical power level. When element 85 is biased to main resonance, this structure operates as a T-R cell, reflecting signals above the critical power level $P_{c2}$ and transmitting signals below this critical power level. These functions are approximately the inverse of the functions of the switch shown in Fig. 7 and, in addition, provide less leakage to the output.

Figure 11:
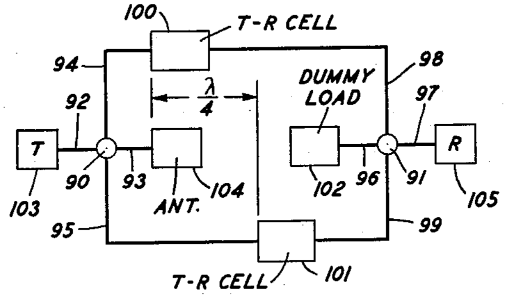
Fig. 11 is a schematic representation of a duplexing circuit employing T-R cells in accordance with Figs. 7 through 10.
Figure 12:
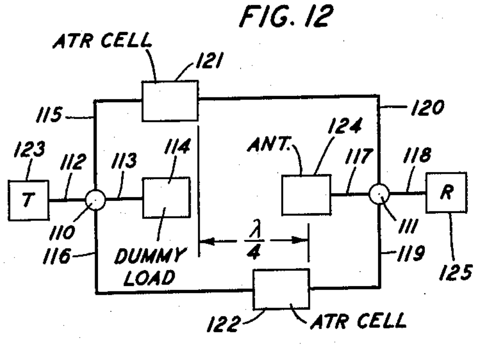
Fig. 12 is a schematic representation of a duplexing circuit employing anti-T-R cells in accordance with Figs. 7 through 10.

In Figs. 11 and 12 are shown schematic representations of balanced duplexing circuits employing T-R and A-T-R switches as shown in Figs. 7 through 10.

In Fig. 11 is shown a schematic representation of a balanced duplexing circuit employing two T-R cells and comprising two hybrid wave guide junctions 90 and 91 in all respects identical to junction 30 in Fig. 6. Hybrid junction 90 has two symmetrical arms 94 and 95 and two asymmetrical arms 92 and 93. Connected to asymmetrical arm 92 is a transmitter 103 and connected to asymmetrical arm 93 is an antenna 104. Connected to symmetrical arms 94 and 95 are T-R cells 100 and 101, respectively, cell 101 being a quarter wavelength of the operating frequency farther from hybrid junction 90 than cell 100.

Hybrid junction 91 has two asymmetrical arms 96 and 97 and two symmetrical arms 98 and 99. Connected to asymmetrical arm 96 is a dummy load 102 and connected to asymmetrical arm 97 is a receiver 105. Symmetrical arm 98 is connected to the other end of T-R switch 100 and symmetrical arm 99 is connected to the other end of T-R switch 101.

In operation, a signal received by antenna 104 is transmitted to hybrid junction 90 where it divides equally between symmetrical arms 94 and 95. This received signal corresponds to a low power level signal and is therefore freely transmitted through T-R cells 100 and 101, passing on to hybrid junction 91. The path length through arm 94, cell 100 and arm 98 is adjusted so as to be equal to the path length through arm 95, cell 101 and arm 99. The signals in arms 98 and 97 therefore arrive at hybrid junction 91 in phase and combine in asymmetrical arm 97 to pass to receiver 105.

When transmitter 103 goes on, the relatively high power signal divides at hybrid junction 90 between symmetrical arms 94 and 95. Upon arriving at T-R cells 100 and 101, these signals trigger the switches to the off condition, forming a short circuit in arms 94 and 95 at the T-R cells. The signal is therefore reflected from T-R cells 100 and 101 and returns to junction 90. Since arm 95 is a quarter-wavelength longer than arm 94, the reflected signals are 180 degrees out of phase. they therefore cancel in asymmetrical arm 92 and combine in asymmetrical arm 93 to pass to the antenna 104.

In Fig. 12 is shown a schematic representation of a balanced duplexing circuit employing the A-T-R cells and comprising two hybrid wave guide junctions 110 and 111 in all respects identical to junction 30 in Fig. 6. Hybrid junction 110 has two symmetrical arms 115 and 116 and two asymmetrical arms 112 and 113. Connected to asymmetrical arm 112 is a transmitter 123 and connected to asymmetrical arm 113 is a dummy load 114. Connected to symmetrical arms 115 and 116 are A-T-R cells 121 and 122, respectively, cell 122 being a quarter-wavelength of the operating frequency farther from hybrid junction 110 than cell 121.

Hybrid junction 111 has two asymmetrical arms 117 and 118 and two symmetrical arms 119 and 120. Connected to asymmetrical arm 117 is an antenna 124 and connected to asymmetrical arm 118 is a receiver 125. Symmetrical arm 120 is connected to the other end of A-T-R cell 121 and symmetrical arm 119 is connected to the other end of A-T-R cell 122.

In operation, a signal received by antenna 124 is transmitted by way of asymmetrical arm 117 to hybrid junction 111 where it divides equally between symmetrical arms 119 and 120. This received signal corresponds to a low power level signal below the critical value and is therefore reflected by A-T-R cells 121 and 122, returning to junction 111. Since arm 120 is a quarter-wavelength longer than arm 119, the reflected signals are 180 degrees out of phase. They therefore cancel in asymmetrical arm 117 and combine in asymmetrical arm 118 to pass to the receiver 125.

When transmitter 123 goes on, the relatively high power signal divides at hybrid junction 110 equally between symmetrical arms 115 and 116. Upon arriving at A-T-R cells 121 and 122, these signals open the switches to the "transmission through" position, allowing the signals to pass the A-T-R cells to junction 111. The path length through arm 115, cell 121 and arm 120 is adjusted so as to be equal to the path length through arm 116, cell 122 and arm 119. The signals in arms 119 and 120 therefore arrive at hybrid junction 111 in phase and combine in asymmetrical arm 117 to pass to antenna 124.

The duplexing circuit shown in Fig. 12 is somewhat superior to that shown in Fig. 11 in that it prevents the transmitter power from leaking to the receiver. A small amount of time is required to operate the switches, during which the signal leaks past the switch instead of being reflected. In the case of Fig. 11, this leakage would eventually pass to the receiver and possibly damage it. In the case of Fig. 12, however, this leakage signal would be reflected from A-T-R cells 121 and 122 and pass to dummy load 114 to be dissipated. Thus the receiver in Fig. 12 is more effectively isolated from the transmitter than in Fig. 11.

The structures illustrated in Figs. 6, 9, 11 and 12 employ wave guide hybrid junctions comprising a combination of an H-arm T-junction and an E-arm T-junction. The same arrangements can be made, however, with any other wave guide arrangement having hybrid properties. For example, two wave guides having a three decibel directional coupler therebetween have hybrid properties and can be used equally well in any of the arrangements described. Furthermore, the principles of these structures are equally adaptable to wave guides having other than rectangular cross-sections.

While gyromagnetic elements have thus far been shown in resonant cavities to form power-operated T-R and A-T-R switches, they are by no means restricted to this configuration. For example, gyromagnetic elements may be used to couple or decouple wave guides employing distributed coupling elements and in this way operate as a switch. Such a configuration would not involve reflections of the incident signals as the resonant cavity configuration does. An illustrative embodiment of a duplexing circuit employing guides with distributed coupling is shown in Fig. 13.

Figure 13:
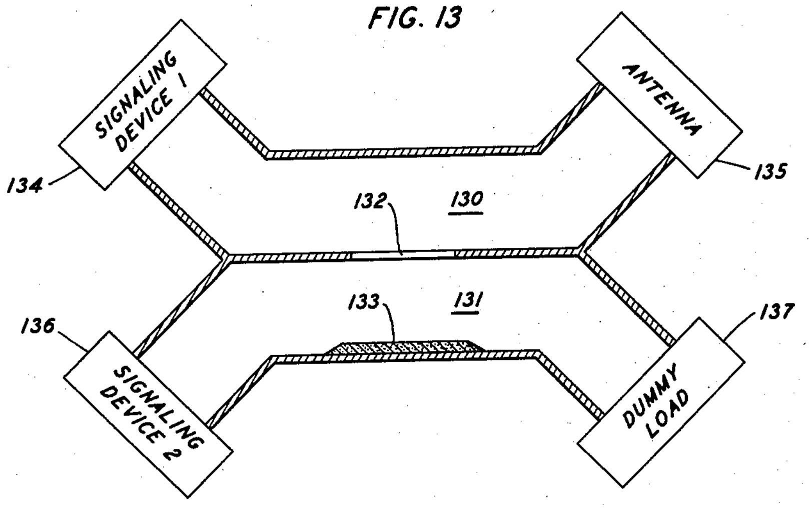
Fig. 13 is a cross-sectional view of another duplexing circuit employing directionally coupled wave guides with power-operated gyromagnetic coupling elements.

In Fig. 13 is shown a cross-sectional view of a duplexing circuit employing power-operated gyromagnetic switches and comprising two sections of conductively bounded wave guide 130 and 131. Guides 130 and 131 lie longitudinally adjacent and are coupled together by coupling slot 132. Included within guide 131 in the region of coupling slot 132 is a rectangular slab 133 of gyromagnetic material which is substantially identical to element 23 in Fig. 4. A first signaling device 134 is connected to one end of guide 130 and an antenna 135 is connected to the other end of guide 130. A second signaling device 136 is connected to one end of guide 13 and a dummy load 137 is connected to the other end of guide 131.

Coupling slot 132 is a zero decibel coupler. The pertinent property of coupling slot 132 is its ability to completely transfer energy from guide 130 to guide 131 when the propagation constants of these two guides are equal.

In operation, slab 133 is biased by a magnetic field to either subsidiary resonance or to main resonance and adjusted to allow complete transfer of energy from guide 130 to guide 131 when element 133 is in a low loss state. When biased to subsidiary resonance, signaling device 134 comprises a signal transmitter and signaling device 136 is a receiver. It can be seen that under this condition, a signal picked up by antenna 135 is transmitted down guide 130, coupled to guide 131 through coupling slot 132, transmitted down guide 131 to signaling device 136, a receiver. When transmitter 134 goes on, the signal is initially coupled through slot 132 to guide 131. This signal is higher than the critical power level and hence makes slab 133 very lossy. This high attenuation in guide 131 decouples the guides and substantially all of the energy is transmitted down guide 130 to antenna 135. Any leakage into guide 131 is dissipated in dummy load 137.

When element 133 is biased to main resonance, signaling device 134 comprises a receiver and signaling device 136 is a transmitter. Under this condition, a received signal picked up by antenna 135 is transmitted down guide 130 to coupling slot 132. Since the signal level is below the critical power, element 133 offers a high attenuation to wave energy in guide 131. Substantially no energy is transferred to guide 131 through coupling slot 132, annd the signal passes on to signaling device 134, a receiver. When signaling device 136, a transmitter, goes on, element 133 is initially in a high loss state and no energy is transferred to guide 130. The initial transmission pulse is therefore highly attenuated by element 133, the remainder going to dummy load 137. Almost immediately element 133 is driven to a low loss state and substantially all of the transmitter power is coupled to guide 130 and thence to antenna 135. The chief advantage of the configuration of Fig. 13 over Figs. 11 and 12 is the extreme structural simplicity of this configuration producing the same or equivalent results. Furthermore, the configuration of Fig. 13 also prevents the initial transmitter pulse from reaching the receiver during the period required to alter the loss state of the gyromagnetic element, as in Fig. 12.

If the T-R and A-T-R switches shown in Figs. 7 through 13 are insufficient to provide suitable decoupling of the receiver during the period of transmission, two or more of such switches may be cascaded to provide the desired effect. The gyromagnetic elements of the second switch must, of course, be chosen so as to have a critical power of a much lower value than that of the first switch. The gyromagnetic element of the second switch must be chosen such that the leakage power past the first switch is sufficient to operate the second switch. In this way, almost any degree of isolation of the receiver may be obtained.

While the frequency response of the devices hereinbefore described is moderately broad, it may be desired to extend the frequency range of these devices to greater limits. As can be seen in Fig. 1, the resonance humps of the large signal response are rather broad, both at subsidiary resonance and at main resonance. It is therefore possible to extend the frequency limits of these devices by providing a gradient in the polarization magnitude longitudinally along the gyromagnetic elements. If this gradient extends between the half-power points on the resonance humps, substantially no degradation in operation of the devices will occur. Furthermore, since the principal frequency limiting effect in the gyromagnetic elements is the lack of correspondence between the applied signal frequency and the uniform precession frequency or preferred spin wave frequency, the response of the gyromagnetic elements can be made extremely broad by providing gradations in the magnitude of the biasing field.

In all cases it is understood that the above-described arrangements are simply illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A device for limiting the power level of microwave energy comprising hybrid-T wave guide junction having two symmetrical arms, each said symmetrical arms being terminated by a conductive plate at equal electrical distance from said junction, an element of magnetically polarizable material capable of exhibiting gyromagnetic effects at the operating frequencies of said device interposed in one of said symmetrical arms, and means for biasing said element by a magnetic field producing main gyromagnetic resonance.

2. In combination, a source of microwave energy exceeding a given power level, means for utilizing said energy at less than one-half said given power level, and a microwave power limiter interposed between said source and said utilizing means, said limiter comprising a hybrid-T wave guide junction having two symmetrical arms, an electrical short circuit connected to each of said symmetrical arms an equal distance from said junction, an element of magnetically polarizable material capable of exhibiting gyromagnetic effects at the frequency of said energy positioned in one of said symmetrical arms, and means for biasing said element to main gyromagnetic resonance.

References Cited in the file of this patent

UNITED STATES PATENTS

| | | |
|---|---|---|
| 2,532,157 | Evans | Nov. 28, 1950 |
| 2,745,069 | Hewitt | May 8, 1956 |
| 2,810,882 | Walker | Oct. 22, 1957 |
| 2,830,289 | Zaleski | Apr. 8, 1958 |

FOREIGN PATENTS

| | | |
|---|---|---|
| 674,874 | Great Britain | July 2, 1952 |

OTHER REFERENCES

Fox et al.: "Bell System Technical Journal," vol. 34, No. 1, January 1955, pages 5–103. (Page 56 relied on.)

Suhl: "Physical Review," vol. 101, pages 1437–1438, February 1956.

Kales et al.: "A Nonreciprocal Waveguide Component," Journal of Applied Physics, vol. 24, No. 6, June 1953, pages 816–17.